United States Patent

Frisch et al.

[15] 3,651,392

[45] Mar. 21, 1972

[54] BANG-BANG MIRROR POSITION SERVOMECHANISM CONTROLLING A LASER SCANNING DEVICE FOR USE IN A TRACK-FOLLOWING MACHINE

[72] Inventors: Otto R. Frisch, 22 Worts Causeway; Graham S. B. Street, Pembroke College, both of Cambridge, England

[22] Filed: Nov. 10, 1969

[21] Appl. No.: 875,139

[30] Foreign Application Priority Data

Nov. 12, 1968 Great Britain......................53,685/68

[52] U.S. Cl..............................318/561, 318/577, 318/603, 318/640, 318/160, 250/237 G
[51] Int. Cl.....................................G05b 13/00, G05b 19/36
[58] Field of Search..................318/561, 577, 603, 630, 640; 250/237 G

[56] References Cited

UNITED STATES PATENTS 2,849,667  8/1958  McMullin........................318/20.520
2,906,933  9/1959  Magnin..........................318/20.050 X
3,114,046  12/1963  Cabaniss et al......................250/237 G
3,193,745  7/1965  Brown..............................318/20.520
3,394,248  7/1968  Ogden...........................250/237 G X

OTHER PUBLICATIONS

P. N. Budzilovich, "Lasers Boost Machine Tool Accuracy," Dec., 1968, Control Engineering, pps. 62–66

Primary Examiner—T. E. Lynch
Attorney—Woodhams, Blanchard and Flynn

[57] ABSTRACT

Apparatus for steering a light beam, suitable for use in a track-following machine, in which two steering mirrors are each controlled by a servomechanism which determines the position of the mirror by counting interference fringes from an interferometer and which accelerates the mirror to the midpoint of its movement and then decelerates it, the approach to the final position being controlled asymmetrically in dependence upon the divergence from the set position to apply a larger force when the mirror is moving away from the required position.

8 Claims, 3 Drawing Figures

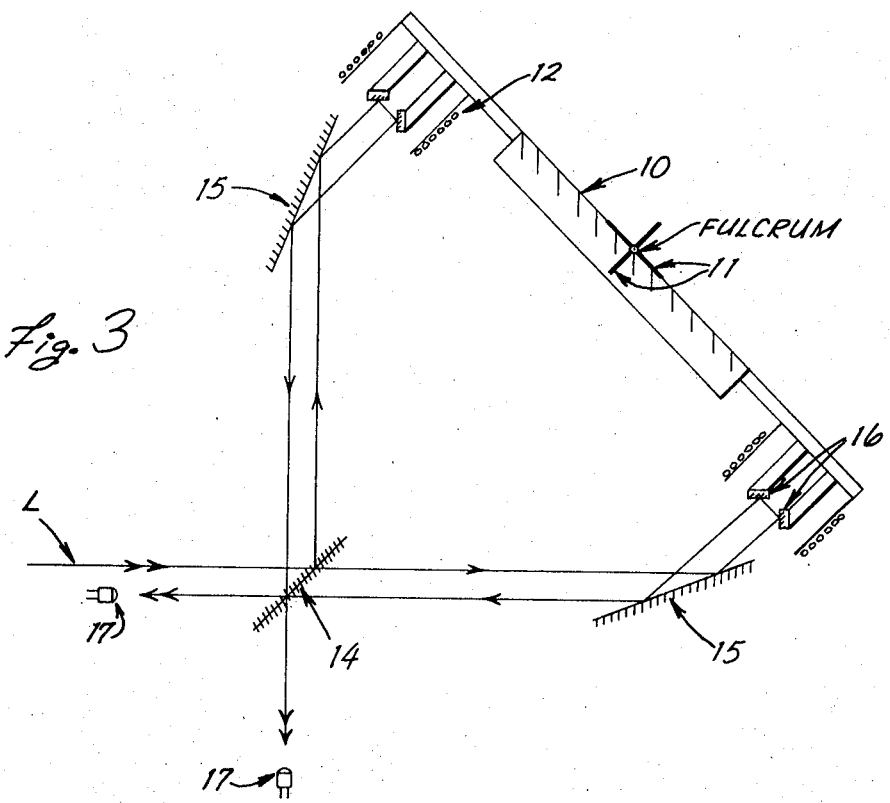

BANG-BANG MIRROR POSITION SERVOMECHANISM CONTROLLING A LASER SCANNING DEVICE FOR USE IN A TRACK-FOLLOWING MACHINE

The present invention relates to apparatus for steering a light beam. The apparatus is particularly suitable for use in a track-following machine such as is used for measuring bubble-chamber photographs.

There are two main types of track following and measuring machines in use at present. One requires an operator to position cross-wires over a series of points on a track and is in consequence slow and tedious. The other scans the whole photograph with a television camera or similar scanning system and uses a large computer to process the resulting information and select individual tracks from the mass of detail in the photograph. This second type is capable of very high speeds of operation but is very expensive because of the complexity of the computation.

It is desirable to develop a machine which comes between these two types and gives adequate speed of operation at reasonable cost while allowing an operator to select the tracks to be measured and exercise overall control of the measurement. Such a machine requires apparatus for steering a light beam so that it can automatically follow a track in the way in which an operator follows it without the necessity of scanning the whole area of the photograph.

In accordance with the present invention there is provided apparatus for steering a light beam comprising a pair of steering mirrors pivoted about perpendicular axes and electromagnetically movable about these axes to the required positions, each steering mirror having an associated interferometric system for detecting its movement and a servo-mechanism to generate control currents for moving the steering mirror from an initial position to a set position, the servo-mechanism comprising a digital store into which a control input representing the set position can be entered, means for comparing the set position with a digital indication of the actual position derived from the interferometric system, first means for generating control currents to accelerate the mirror towards the set position until the comparison means indicates that the actual position is mid-way between the initial position and the set position and thereafter to decelerate the mirror at the same rate as the previous acceleration, and second means operative as the mirror approaches the set position to generate control currents dependent on the divergence from the set position and upon whether this divergence is increasing or decreasing to apply a greater force to the mirror when it is moving away from the set position than when it is moving towards the set position.

In the application of this apparatus to a track-following machine the steered beam is a laser beam which passes through an astigmatic lens to produce a line image and through a rotating Dove prism which rotates the line image about a point beyond one end of the line. The rotating line image, when placed over a point on a track, serves to detect the line of the track since there will be a dip in the intensity of the transmitted beam at two opposite positions when the line passes over the track. The control input to the servomechanism is derived from signals produced by the dip in intensity and moves the steering mirrors in such a way that the point about which the line image is rotated is advanced along the track in order to trace out the track. Successive positions of the steered beam are recorded to measure the track.

The servomechanism of the steering apparatus provides for rapid and accurate movement of the mirror towards the set position, the mirror being preferably pivoted on crossed springs which allow free-swinging movement. The acceleration and deceleration of the mirror should theoretically result in its arriving at the set position at zero velocity but in practice there will be some undershoot or overshoot of the set position and to correct this the asymmetric control is brought into operation near the set position.

The interferometric system is preferably of the Michelson type using pairs of V-mirrors with an included angle of 90° mounted on the steering mirror to return the interfering beams in the same direction regardless of the position of the steering mirror. The partially reflecting mirror which splits a beam from the laser into two interfering beams preferably has a coating such that a 90° phase shift is introduced between the two sets of interference fringes, allowing measurement of the movements of the steering mirror to an accuracy of one quarter of a fringe.

The invention will now be described in more detail with the aid of an example illustrated in the accompanying drawings, in which:

FIG. 3 shows in enlarged form the interferometer portion of the apparatus of FIG. 1.

Figure 1:
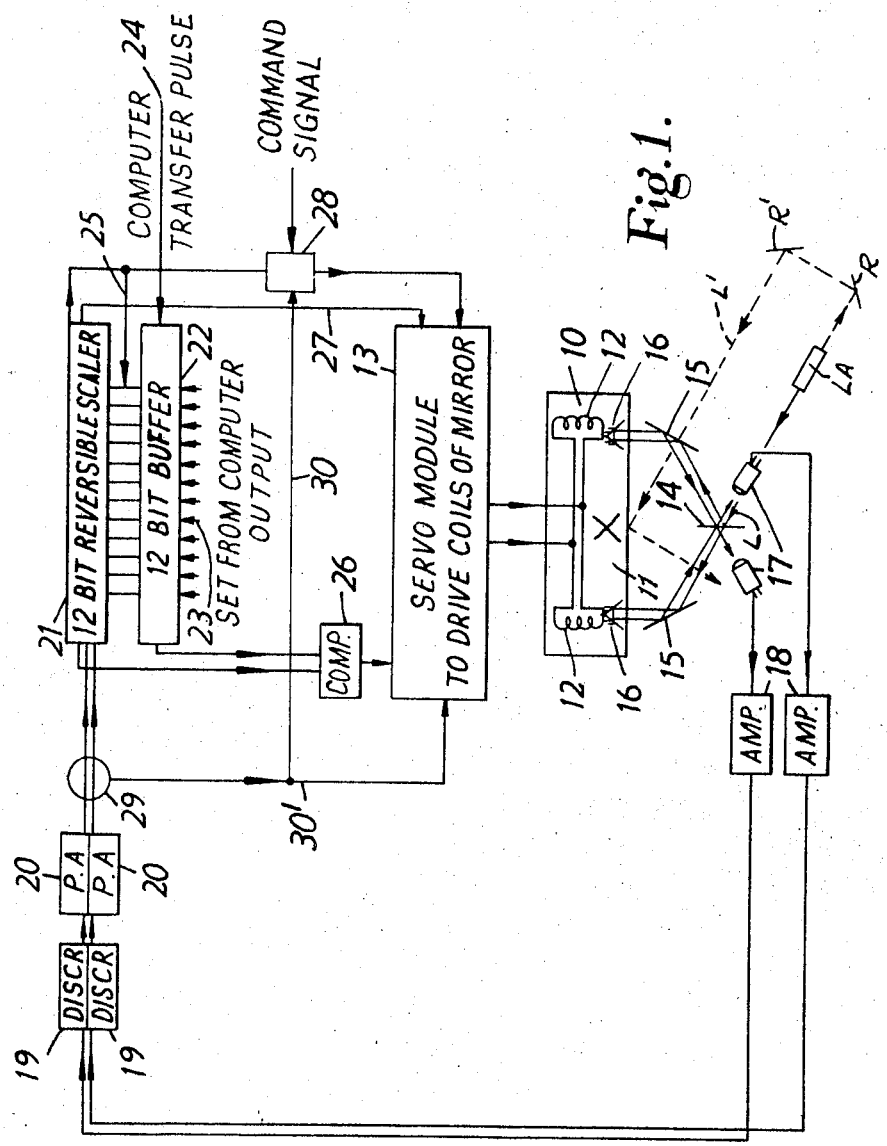
FIG. 1 shows diagrammatically apparatus in accordance with the invention for controlling the position of a mirror to scan a light beam over a film in a track-measuring apparatus.

Referring first to FIG. 1, the member to be controlled is a steering mirror 10 which is accurately pivotably mounted by means of two pairs of crossed springs, one of which is shown schematically at 11. The mirror 10 carries two coils 12 which lie within the magnetic fields of respective pot magnets (not shown) and which are fed with control currents from a servomodule 13 to control the position of the mirror. The movements of the mirror 10 are detected by an interferometer of the Michelson type whose light L is derived from the same laser LA which supplies in any convenient way, for example from the opposite end thereof via reflectors R and R', the main beam L' steered by the mirror 10. In the interferometer the light L falls on a partially reflecting mirror 14 which splits it into two beams which after reflection by fixed mirrors 15 fall on respective V-mirrors 16 carried by the mirror 10. The mirrors of each pair of V-mirrors are set at 90° to one another to ensure the return of the beam in the same direction independent of the position of the mirror 10. The reflected beams pass by way of the mirrors 15 to the mirror 14 and thence to two photosensitive diodes 17. The coating of the partially reflecting mirror 14 is preferably such that the interference fringes seen by the two diodes 17 are 90° out of phase. The outputs of the two diodes are passed by way of respective amplifiers 18, discriminators 19, and power amplifiers 20 to a 12-bit reversible scaler 21. In this way the movements of the mirror can be measured in units of one quarter of an interference fringe in the same manner as in conventional Moire fringe counting.

The partially reflecting mirror with the required phase shift can be prepared by applying an aluminum coating to a transparent support, the coating being of such a thickness that its transmission coefficient is less than 20 percent, and then heating the coating in air at a temperature in excess of 400° C. until the transmission coefficient has increased to between 30 percent and 45 percent. For a given initial thickness of the coating experiment will be necessary to determine the exact value of the transmission coefficient which corresponds to a 90° phase shift. When the initial thickness is such as to give a transmission coefficient of 10 to 15 percent heating at between 400° C. and 500° C. for between 8 and 15 minutes will increase the transmission coefficient to 35 to 40 percent and result in a phase shift close to 90°. A transmission coefficient of 10 to 15 percent corresponds to a reflection coefficient of about 80 percent and the reduction of the reflection coefficient can be used just as well as the increase in the transmission coefficient to monitor the changes in the layer which occur during the heat treatment.

All transmission and reflection coefficients are measured in air with light at normal incidence.

The aluminum layer must be clean before commencing the heat treatment and if necessary can be cleaned with isopropyl alcohol or some similar solvent.

The final transmission coefficient is preferably about 35 to 40 percent since this gives approximately equal transmission and reflection, which means that the interfering beams are of the same amplitude. However good interference fringes can be obtained even when the amplitudes of the two beams are substantially different. A lower final transmission coefficient requires a thicker initial layer with a lower transmission coefficient and this may require heating at a higher temperature.

It will be apparent that this method and the partially reflecting mirror produced by it are of general application and can be used in the manufacture of other interferometric systems which may be used for other purposes.

The scaler is associated with a buffer store 22 into which a value can be set by the computer by way of connections 23 to the computer output. A value is set in the buffer store on receipt of a computer transfer pulse on line 24. This set value representing a desired move to a new position by the mirror is transferred to the scaler 21 when the scaler is in the zero condition. The mirror normally oscillates slightly even in the rest condition and the value in the scaler changes between 0 and −1 at a few kc./s. An enabling signal is generated on line 25 when the scaler is in the zero condition to transfer the set value to the scaler. A comparator 26 compares the value in the scaler 21 with half the set value in the buffer store 22 and the output applied to the servo-module 13 determines the direction of the current in the steering coils 12 of the mirror 10.

All the inputs to the servo module 13 are shown schematically by a single line but consist in practice of a pair of lines, only one of which receives a signal at any one time. Thus the comparator 26 selects the initial direction of movement, in accordance with the sign of the set value in the buffer, by generating an output on one line and reverses the current to effect deceleration by switching the output to the other line when the halfway position is reached.

The start of a move is triggered by the scaler 21 through a control circuit 28 which is primed by a command signal from the computer at the same time that a value is set into the buffer store.

A direction detector 29 coupled to the outputs of the diodes 17 provides a signal on line 30 indicating the direction of movement of the mirror. The servo-module 13 includes a section providing well-damped servo-action under the control of the scaler, and the signal on the line 30 applied to the control circuit 28 serves to switch back to this section when the direction of the mirror is reversed by the decelerating current.

Figure 2:
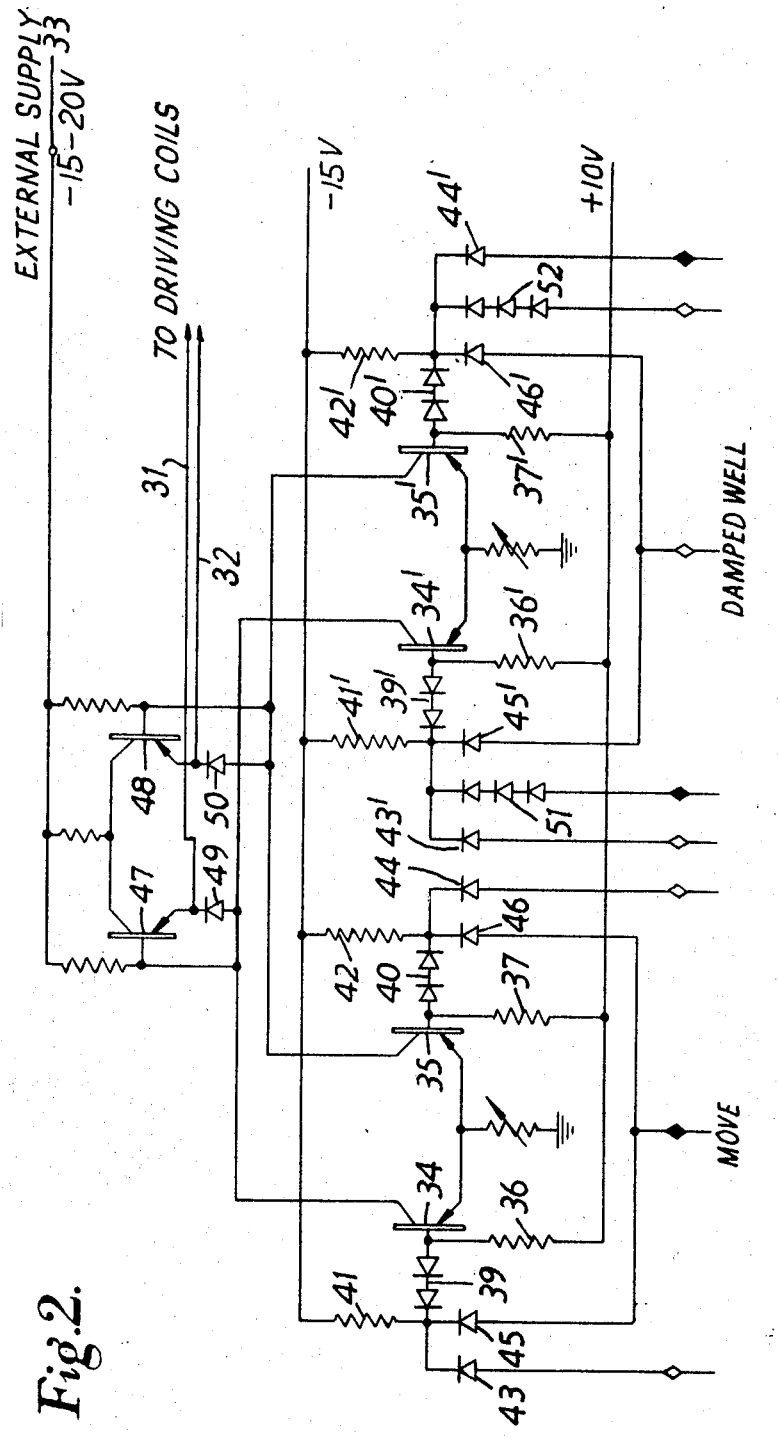
FIG. 2 shows the circuit of the servo module of FIG. 1.

Details of the servo-module are shown in FIG. 2. It serves to connect lines 31 and 32 leading to the driving coils 12 between an external supply terminal 33 and earth in one sense or the other depending on the movements required. The part of the circuit in the lower left-hand part of FIG. 2 serves to effect movement of the mirror from one position to another. Two transistors 34 and 35 are connected between the lines 31 and 32 respectively, and earth and are selectively rendered conducting for acceleration or deceleration of the mirror by signals applied to the base of 34 or to the base of 35 from the comparator 26. A "move" signal from the control circuit 28 must first be applied to enable this part of the circuit. The bases of transistors 34 and 35 are both connected by way of resistors 36 and 37 respectively, to a positive line 38. They are also connected by way of pairs of diodes 39 and 40, respectively, and by resistors 41 and 42, respectively, to a negative line. The signals from the comparator 26 are applied to the junction of the diode pair 39 and the resistor 41 and to the junction of the diode pair 40 and the resistor 42 by way of diodes 43 and 44, respectively, and the move signal is applied to the same junctions by way of diodes 45 and 46, respectively.

The part of the circuit in the upper part of FIG. 2 ensures that current can only flow through the coils in one direction at a time. It consists of two transistors 47 and 48 associated with the lines 31 and 32, respectively, and diodes 49 and 50 in the emitter circuits of the transistors 47 and 48, respectively. When for example, transistor 34 is conducting and current is flowing in the circuit from earth, through transistor 34 and line 31 to the driving coil and back by way of line 32, the diode 50 and the transistor 48 convey the current to the terminal 33 and the transistor 47 is cut off to prevent current flow between the line 31 and the terminal 33. When the current is reversed by selection of the transistor 35, 48 is cut off and 47 is conducting.

The part of the circuit in the lower right-hand part of FIG. 2 is similar in most respects to that in the lower left-hand part of the Figure and corresponding elements have been given the same reference numerals with primes. In this case the diodes 45' and 46' serve for the application of an enabling signal which brings this part of the circuit into use in place of the "move" part when the signal on the line 30 shows the first reversal of the direction of movement of the mirror after passing the halfway position. Thereafter the circuit operates on signals from the scaler which are applied from the line 27 (FIG. 1) by way of the diodes 43' and 44' to select the transistor 34' or 35' according to the direction of current required to return the mirror to the set position and the scaler to zero. However, in addition, a signal on the line 30' (FIG. 1) indicating the direction of movement causes one or other of two groups of diodes 51 and 52 to be selected and when the actual direction of movement is contrary to the direction required by the signals from the scaler, this is when the mirror is moving away from the set position, an increased current is passed to the coils by the transistor 34' or 35' by reason of the change in base voltage due to the diodes 51 or 52, respectively. It is found preferable to use three identical diodes in each of the groups of diodes 51 and 52, these diodes being the same as the diodes 43' and 44'. By this mode of operation, which is an asymmetrical servo action, the mirror is rapidly brought to the required position. This is referred to as the "damped well" mode, in contradistinction to the "move" mode which is effected by the lower left-hand part of the circuit of FIG. 2.

We claim:

1. Apparatus for steering a light beam comprising the combination: a steering mirror pivoted about an axis and means for electromagnetically moving the steering mirror about such axis, said steering mirror having an associated interferometric system for detecting its actual position and a servomechanism to generate control currents for moving the steering mirror from an initial position to a set position, the servomechanism including a digital store into which a control input representing the set position can be entered, means for comparing the set position with a digital indication of the actual position derived from the interferometric system, first means responsive to said comparing means for accelerating the mirror towards the set position until the comparison means indicates that the actual position is mid-way between the initial position and the set position and thereafter for decelerating the mirror at the same rate as the previous acceleration, and second means operative as the mirror approaches the set position ans responsive to the sign of the divergence of the actual position from the set position and responsive to whether this divergence is increasing or decreasing for applying a greater force to the mirror when it is moving away from the set position than when it is moving towards the set position.

2. Apparatus as claimed in claim 1 in which the interferometric system is a Michelson system.

3. Apparatus as claimed in claim 2 having V-mirrors with a 90° included angle mounted on each steering mirror to return the interfering beams always in the same direction.

4. Apparatus as claimed in claim 2 in which the interferometric system includes a partially reflecting beam-splitting mirror with a coating which produces a 90° phase shift between the two sets of interference fringes.

5. Apparatus as claimed in claim 1 in which each of said first and second means generate control currents and comprise a pair of transistors which can be selectively rendered conducting in dependence upon the required direction of motion by control pulses.

6. Apparatus as claimed in claim 5 in which the second control current generating means has a secondary input associated with each transistor for control pulses which increase the control current when the mirror is moving away from the set position.

7. Apparatus as claimed in claim 1 in which each steering mirror is pivotably mounted by means of pairs of crossed springs.

8. Apparatus as claimed in claim 3 in which the interferometric system includes a partially reflecting beam-splitting mirror with a coating which produces a 90° phase-shift between the two sets of interference fringes, in which each of said first and second means generate control currents and comprise a pair of transistors which can be selectively rendered conducting in dependence upon the required direction of motion by control pulses, the second control current generating means having a secondary input associated with each transistor for control pulses which increase the control current when the mirror is moving away from the set position, and in which each steering mirror is pivotably mounted by means of pairs of crossed springs.

* * * * *